United States Patent
Nichols

(10) Patent No.: US 8,620,478 B2
(45) Date of Patent: Dec. 31, 2013

(54) APPARATUS AND METHOD FOR PROTECTING A BUILDING

(75) Inventor: Paul Ian Nichols, Falmouth (GB)

(73) Assignee: Prestige Air-Technology Limited, Ashford (GB)

( * ) Notice: Subject to any disclaimer, the term of this patent is extended or adjusted under 35 U.S.C. 154(b) by 586 days.

(21) Appl. No.: 12/744,710

(22) PCT Filed: Nov. 25, 2008

(86) PCT No.: PCT/GB2008/003932
§ 371 (c)(1),
(2), (4) Date: May 26, 2010

(87) PCT Pub. No.: WO2009/068863
PCT Pub. Date: Jun. 4, 2009

(65) Prior Publication Data
US 2010/0300005 A1 Dec. 2, 2010

(30) Foreign Application Priority Data

Nov. 26, 2007 (GB) .................................. 0723130.1
Nov. 20, 2008 (GB) ................. PCT/GB2008/003895

(51) Int. Cl.
| | | |
|---|---|---|
| G05D 7/00 | (2006.01) | |
| G05D 11/00 | (2006.01) | |
| A61L 2/18 | (2006.01) | |
| B05B 7/32 | (2006.01) | |
| G06F 11/00 | (2006.01) | |
| H03F 1/26 | (2006.01) | |

(52) U.S. Cl.
USPC ............. 700/283; 422/37; 239/337; 702/188; 702/189

(58) Field of Classification Search
USPC .............................. 700/283; 422/37; 239/337; 702/188–189
See application file for complete search history.

(56) References Cited

U.S. PATENT DOCUMENTS

| 4,625,474 A | 12/1986 | Peacock et al. |
|---|---|---|
| 4,671,435 A * | 6/1987 | Stout et al. .................... 222/646 |
| 5,378,086 A | 1/1995 | Campbell, Jr. et al. |

(Continued)

FOREIGN PATENT DOCUMENTS

| AU | 7403274 A | 4/1976 |
|---|---|---|
| DE | 4308585 A1 | 9/1994 |

(Continued)

OTHER PUBLICATIONS

United Kingdom Search Report dated Feb. 29, 2008, GB0723130.0.

(Continued)

*Primary Examiner* — Ronald Hartman, Jr.

(57) ABSTRACT

There is provided an apparatus (1) and method for protecting a building (3) from pests or other nuisances in the vicinity of buildings. The apparatus (1) comprises a monitor (7) having the ability to acquire environmental condition information relating to environmental conditions in a vicinity of the building (3), and a treatment controller (9) which is capable of using the environmental condition information received from the monitor (7) to provide an amount of treatment agent which, for those environmental conditions, remains below a safety threshold for habitation of the building (3) and reduces a population of the pests. The present invention circumvents the need to evacuate inhabitants of the buildings before any treatment agent is administered to the ground lying therebeneath. Further, near-continuous protection and treatment of buildings is also possible.

24 Claims, 1 Drawing Sheet

(56) References Cited

U.S. PATENT DOCUMENTS

| | | | |
|---|---|---|---|
| 5,860,266 A | 1/1999 | Martinet et al. | |
| 6,023,879 A | 2/2000 | Katz et al. | |
| 6,223,464 B1 | 5/2001 | Nekomoto et al. | |
| 6,230,660 B1 * | 5/2001 | Greeson | 119/665 |
| 6,349,888 B1 | 2/2002 | Au et al. | |
| 6,724,312 B1 * | 4/2004 | Barber et al. | 340/573.2 |
| 7,056,522 B2 * | 6/2006 | Voris et al. | 424/419 |
| 7,295,898 B2 * | 11/2007 | Lovett et al. | 700/283 |
| 8,201,756 B2 * | 6/2012 | Hornsby et al. | 239/327 |
| 8,256,135 B2 * | 9/2012 | Hedman | 34/381 |
| 2002/0011020 A1 * | 1/2002 | Nelson et al. | 43/107 |
| 2002/0192230 A1 | 12/2002 | Srivastava | |
| 2004/0001777 A1 * | 1/2004 | Hobson et al. | 422/37 |
| 2004/0067178 A1 | 4/2004 | Molleker | |
| 2005/0039379 A1 | 2/2005 | Pollinger | |
| 2005/0220662 A1 | 10/2005 | Hedman | |
| 2006/0086823 A1 * | 4/2006 | Colarusso et al. | 239/337 |
| 2006/0149509 A1 * | 7/2006 | Chyun | 702/189 |
| 2008/0307694 A1 * | 12/2008 | Nichols | 43/125 |
| 2010/0300005 A1 * | 12/2010 | Nichols | 52/1 |

FOREIGN PATENT DOCUMENTS

| | | | | |
|---|---|---|---|---|
| EP | 1570734 A1 | 9/2005 | | |
| FR | 2852201 A | 9/2004 | | |
| GB | 834004 A | 5/1960 | | |
| GB | 2265639 A | 10/1993 | | |
| GB | 2373004 A | 9/2002 | | |
| GB | 2 432 375 A | 5/2007 | | |
| JP | 06327390 A | 11/1994 | | |
| JP | 11036470 A | 2/1999 | | |
| JP | 2001045957 A | 2/2001 | | |
| JP | 2003010732 A | 1/2003 | | |
| JP | 2004132020 A | 4/2004 | | |
| JP | 2005221131 A | 8/2005 | | |
| WO | WO-2005046743 A1 | 5/2005 | | |
| WO | WO2007/060399 | * | 5/2007 | A01M 1/24 |

OTHER PUBLICATIONS

International Search Report dated Jun. 19, 2009, PCT/GB2008/003932.

* cited by examiner

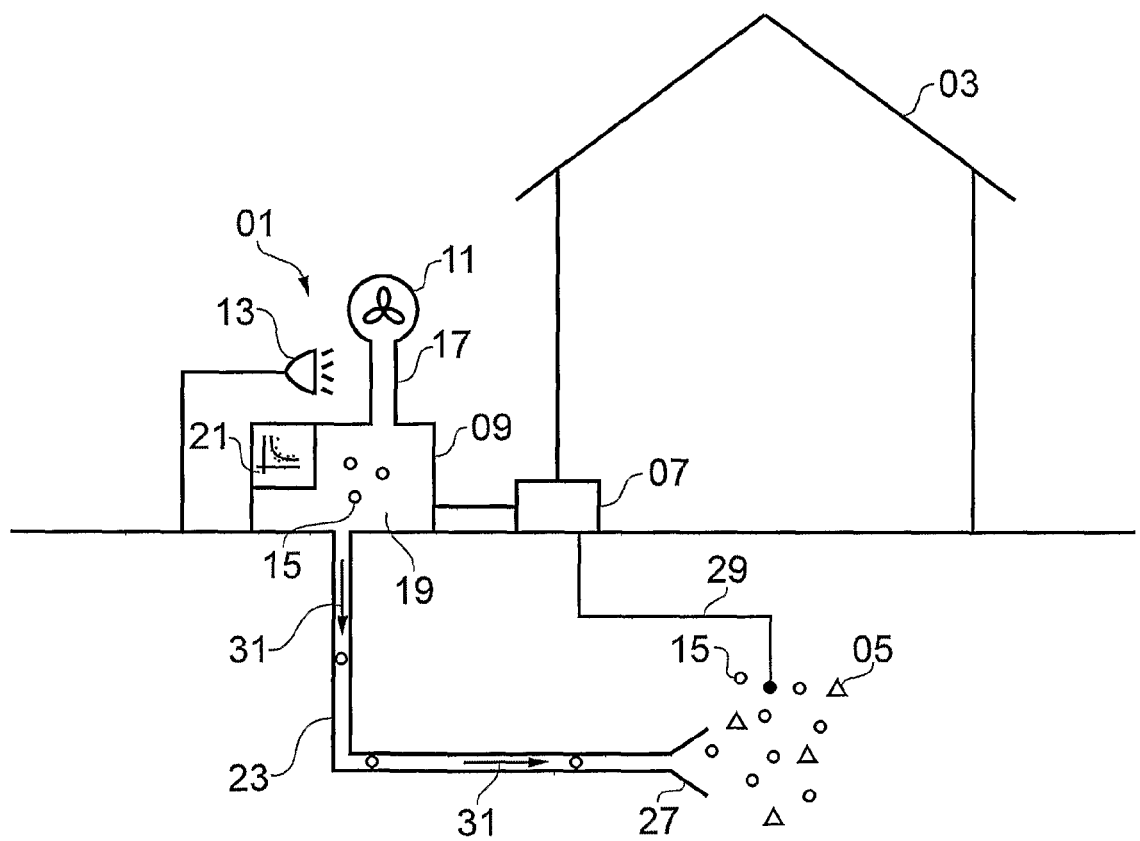

APPARATUS AND METHOD FOR PROTECTING A BUILDING

CROSS-REFERENCE TO RELATED APPLICATIONS

This application is the U.S. national phase of PCT/GB2008/003932 filed Nov. 25, 2008, which claims priority of Great Britain Patent Application No. 0723130.1 filed Nov. 26, 2007, and PCT/GB2008/003895 filed Nov. 20, 2008.

FIELD OF THE INVENTION

The present invention relates generally to an apparatus and a method for protecting a building. Embodiments of the present invention relate to an apparatus and a method for use against pests or other nuisances in the vicinity of buildings.

BACKGROUND OF THE INVENTION

Existing methods of controlling the damage caused by subterranean pests such as, for example, termites or fungi involve the use of a chemical treatment. The treatment process is generally conducted by investing the pest infested region with a suitable treatment agent so as to deter, inhibit the growth of and/or terminate any pests which may reside within the vicinity of the building intended to be protected. The building will typically remain unoccupied during and for a period after the administration of the treatment agent to ensure that the inhabitants suffer no ill effect due to the presence of the treatment agent.

It is desired to provide an improved technique for protecting a building.

SUMMARY OF THE INVENTION

According to a first aspect of the present invention, there is provided an apparatus for protecting a building from degradation by pests, said apparatus comprising: a monitor operable to acquire environmental condition information relating to environmental conditions in a vicinity of the building; a treatment controller operable to control administration of a treatment agent in said vicinity of said building based on said environmental condition information to provide an amount of said treatment agent which for those environmental conditions remains below a safety threshold for, habitation of the building and reduces a population of said pests.

The present invention recognises that one of the primary disadvantages associated with conventional pest control methods is that it becomes necessary to evacuate the building before any treatment agent can be administered to the ground lying therebeneath because a higher dose than may be necessary will typically need to be applied to ensure that the dose is completely effective in treating the pests. As a result, home dwellers can be forced to experience the inconvenience of being unable to inhabit their homes whilst the treatment process is conducted to ensure their safety. Furthermore, near-continuous protection and treatment of buildings is not possible because of the need to evacuate the building each time the treatment process is performed.

The apparatus acquires information on the environmental conditions within the vicinity of a building. This enables knowledge of the actual environmental conditions to be used to control the dose that is applied, rather than assuming that a particular set of environmental conditions exist. Hence, the dose can be optimised to suit the environmental conditions at that time. This helps to ensure that the most effective dose possible is administered, whilst using the knowledge of the effect of the environmental conditions on the treatment agent itself ensures that the dose remains below the safety threshold for habitation of the building. Hence, the building can remain inhabited during the treatment process and near-continuous protection and treatment can be performed.

In particular, due to the tendency of treatment agents to decay at a greater rate under some environmental conditions, the treatment controller is able to control the dosage of the treatment agent to be administered so that the amount of treatment agent in the vicinity of the building at any one time remains below the safety threshold, although it is possible that the amount actually administered, before decay of the treatment agent occurs due to those environmental conditions, may well be above the safety threshold. Hence, a higher thane expected dose can be applied to provide effective pest treatment whilst ensuring the safety threshold is not exceeded.

In embodiments, said treatment controller comprises a model describing effects of said environmental conditions on said treatment agent, said treatment controller being operable to utilise said model to determine said amount of said treatment agent which, for those environmental conditions represented by said environmental condition information, remains below said safety threshold. Providing a model enables accurate control of the treatment agent to be achieved. The model may describe how, for example, the concentration of the treatment agent varies as, for example, temperature, humidity and pressure or other environmental conditions vary. The environmental condition information can then be provided to the model which can in turn provide an amount of treatment agent to be administered which will remain below a safety threshold.

It will be appreciated that the geology of the ground in the vicinity of the building, details of the building construction and/or the physical layout of the apparatus may also affect the supply and accumulation of the treatment agent. Accordingly, in embodiments, said treatment controller is operable to receive physical condition information relating to at least one of a physical arrangement of said apparatus, geological information in said vicinity of said building and constructional information of said building and said model describes effects of physical conditions on said treatment agent, said treatment controller being operable to utilise said model to determine said amount of said treatment agent which, for those physical conditions represented by said physical condition information and those environmental conditions represented by said environmental condition information, remains below said safety threshold. Hence, the model may also describe one or more of these physical characteristics and the model may determine how, for example, the concentration of the treatment agent varies in response to these physical characteristics. The physical characteristic information can then be provided to the model which can in turn provide an amount of treatment agent to be administered which will remain below a safety threshold.

In embodiments, the treatment controller may be capable of processing the information it receives from the monitor. The information thus processed can then be used to understand the status of parameters of the environmental conditions such as temperature, pressure and relative humidity so that the administration of treatment agent may be adapted to suit those particular parameters based on knowledge of how parameters affect the treatment agent. For example, the longevity or concentration of some treatment agents may vary considerably based on the environmental conditions that they experience. This information may then be used to further calibrate the model.

In embodiments, the apparatus may comprise a detector for monitoring a decay of the treatment agent. Due to the tendency of different substances to decay at different rates under different conditions, it may be necessary to monitor the decay of a particular treatment agent so that it can be ensured that it is administered at an amount which ensures that the safety threshold is not exceeded. The environmental conditions can significantly influence the half-life of a substance. For example, the half-life of ozone can vary typically between three months at 20° C., to three days at 50° C., to one, and a half hours at 120° C. A general trend appears to be that the half-life of many substances reduces as the temperature of the environmental condition is increased. Likewise, the physical layout of the apparatus, the geology in the vicinity of the building and the construction of the building can affect the decay and any accumulation of the treatment agent.

In embodiments, the treatment controller may be operable to administer the treatment agent in a pulse-like manner. Moreover, the treatment controller may be operable to modify the duration of each pulse. The treatment agent may be administered in pluses for half a second at a time at intervals in the regions of 160 seconds, for example. In this way, a dosing regime can be varied to suit the particular needs of the environmental and/or physical conditions. A pulsing administration technique of a treatment agent can also have the effect of transmitting the treatment agent to depths greater than those which would be attainable by alternative administration techniques, such as continuous administration, for example.

In embodiments, the treatment controller may be operable to modify the concentration of the treatment agent. A "zone of influence" of the treatment agent can be controlled by regulating the concentration of the treatment agent and/or by controlling the locations at which the treatment agent is administered. As a way of minimising the amount and concentration of the treatment agent being used, naturally occurring periods of low temperature and low humidity, during the night for example, may be used where decay of the treatment agent is likely to be less than that which would occur during the day. Conversely, it may be necessary to raise the dosage/concentration of the treatment agent when it is administered during the day.

In embodiments, the treatment agent comprises ozone and the apparatus may comprise an ozoniser, which may comprise a UV lamp. This enables ozone to be generated on-site. Alternatively, ozone may be generated by a corona discharge technique. Ozone has no residual properties and returns to oxygen in a short time, and therefore does not create secondary damage due to residual components, as insecticide does.

According to a second aspect of the present invention, there is provided a method for protecting a building from attack by pests, comprising the steps of acquiring environmental condition information relating to environmental conditions in a vicinity of the building; and controlling administration of a treatment agent in said vicinity of said building based on said environmental condition information to provide an amount of said treatment agent which for those environmental conditions remains below a safety threshold for habitation of the building and reduces a population of said pests.

In embodiments, said step of controlling comprises: providing a model describing effects of said environmental conditions on said treatment agent, and utilising said model to determine said amount of said treatment agent which, for those environmental conditions represented by said environmental condition information, remains below said safety threshold.

In embodiments, said step of acquiring comprises: receiving physical condition information relating to at least one of a physical arrangement of said apparatus, geological information in said vicinity of said building and constructional information of said building, and said step of controlling comprises: providing a model describing effects of physical conditions on said treatment agent, and utilising said model to determine said amount of said treatment agent which, for those physical conditions represented by said physical condition information and those environmental conditions represented by said environmental condition information, remains below said safety threshold.

In embodiments, the method comprises the step of detecting a decay of said treatment agent.

The step of regulating the treatment agent may include the step of processing the information acquired on the environmental conditions. The step of processing the information may include comparing the acquired information against standard values. Alternatively or additionally, the step of processing the information may include the interpolation of the acquired information. This allows the environmental conditions to dictate the optimum levels of treatment agent to be administered without exceeding the safety threshold to humans and animals inhabiting the building.

In embodiments, the treatment agent may be administered during environmental conditions of low humidity and/or low temperature. Accordingly, the treatment agent may be administered during the evening and/or through the night. In embodiments, the treatment agent may be administered when the humidity in the vicinity of the building is less than 60%. In embodiments, the treatment agent may be administered when the temperature in the vicinity of the building is less than 21° C.

In embodiments, the treatment agent may be administered at temporally spaced intervals. The treatment agent may be utilised more efficiently in this manner. In embodiments, the temporally spaced intervals may be irregular. By irregularly spacing the intervals, pests can be prevented from becoming preconditioned to the dosing regime and building a resistance thereto.

In embodiments, the treatment agent may be administered in a pulse-like manner. and the duration of each pulse may be modified to administer the correct amount.

In embodiments, the concentration of the treatment agent may be modified to administer the correct amount.

In embodiments, the treatment agent may be administered in larger amounts during periods when the building is unoccupied. This may be, for example, during an annual maintenance review by an engineer who may "boost" the dosage temporarily to ensure that the apparatus is functioning correctly. Alternatively, the habitants may provide a "boost" every 3 weeks, for example, to ensure the maximum effect is achieved.

In embodiments, the treatment agent may be ozone, which provides a hostile environment to the pests due to its strongly oxidising characteristics.

In embodiments, the method may comprise the step of generating ozone. This may, for example, be by a UV lamp reacting with air. In this way, the ozone concentration may be modified by varying the lamp intensity, where an increase in lamp intensity would lead to an increase in the production of oxygen radicals thereby increasing the ozone concentration, and vice versa. Alternatively, the ozone concentration may be varied by modifying the air flow rate passing before the UV lamp, where a slower air flow rate would correlate with higher ozone generation. In this way, by switching the UV lamp off, the ground beneath the building may be ventilated by continuing to administer the air for a predetermined period, such as 2 minutes for example. The ground may be purged of treatment agent in this way.

BRIEF DESCRIPTION OF THE DRAWINGS

FIG. 1 is a schematic side view of a building and an apparatus for protecting the building from degradation by pests according to an embodiment.

DESCRIPTION OF THE EMBODIMENTS

Referring to FIG. 1, there is illustrated a building 3 and an apparatus 1 for protecting the building 3 from degradation by pests 5. The apparatus 1 comprises a monitor 7, a treatment controller 9, a fan unit 11 and a UV lamp 13.

The monitor 7 is operable to acquire environmental condition information relating to environmental conditions in a vicinity of the building. In this embodiment, the monitor 7 is positioned such that at least part of its body is located interiorly of the building 3, and at least part of its body of is located exteriorly of the building 3. In this way, the monitor 7 can acquire environmental condition, information of both the internal and external environments of the building 3, which information can then be collated and conveyed to the treatment controller 9. The monitor 7 acquires information on parameters such as temperature, pressure and humidity using measurement devices such as a thermometer, barometer and humidity sensor respectively.

The treatment controller 9 is operable to control the concentration and administration of a treatment agent 15 in the vicinity of the building based on the environmental condition information to provide an amount of treatment agent 15 which, for those environmental conditions, remains below a safety threshold for habitation of the building 3 and reduces a population of pests 5.

In this embodiment, the treatment agent 15 is ozone. The ozone 15 is generated in-situ by means of the fan unit 11 and UV lamp 13. The fan unit 11, which is connected to the treatment controller 9 by means of an air conduit 17, regulates the flow of air through the air conduit 17 towards the treatment controller 9. The UV lamp 13 is positioned so that its rays are directed on the air conduit 17 so that any air which is conveyed therethrough is consequently converted to ozone before it reaches the treatment controller 9. The treatment controller 9 comprises a storage tank 19 within which the ozone 15 is stored in preparation for use.

The treatment controller 9 also comprises a model 21 which describes the effects of the environmental conditions on the ozone 15. Parameters of the environmental conditions which are monitored include the temperature, humidity and pressure. By way of the model 21, the treatment controller 9 is operable to determine the amount of ozone 15 which, for those environmental conditions represented by the environmental condition information, will remain below the safety threshold. The safety threshold could be to ensure that the concentration of ozone by volume is not greater than 0.1% so that an inhabitant of the building 3 is never exposed to a concentration of more than 0.1%. Of course, a concentration of ozone greater than 0.1% may be administered into the vicinity of the building 3 with the intention that upon reaching the building 3 the concentration of ozone does not exceed 0.1%.

The treatment controller 9 is operable to receive physical condition information relating to a physical arrangement of the apparatus 1, geological information in the vicinity of the building 3 and constructional information of the building 3. The treatment controller 9 thus is able to take account of the effects of physical conditions on the ozone 15.

In use, having established the physical conditions and the current environmental conditions in the vicinity of the building 3 from the information that it receives from the monitor 7, the treatment controller 9 utilises the model 21 to ascertain the appropriate level of ozone 15 that should be administered into the vicinity of the building 3 to protect it from degradation by pests 5. The model 21, in this embodiment, is able to generate the appropriate level of ozone 15 because it utilises previously imputed information describing how the ozone will react when administered into the vicinity having those particular environmental and physical conditions. This enables knowledge of the actual environmental and physical conditions to be used to control the dose that is applied, rather than assuming that a particular set of environmental and physical conditions exist.

The treatment controller 9 is provided with an ozone conduit 23 which extends generally downwardly from the treatment controller 9, located at ground level, into the ground 25 beneath the building 3. The pests 5, constituted by termites in this example, are located in the ground 25 beneath the building 3. For this reason, the free end 27 of the ozone conduit 23 is also positioned in the ground 25 beneath the building 3. The treatment controller 9, therefore, continuously administers the appropriate level of ozone 15 through the ozone conduit 23 in the direction indicated by the arrows 31, the ozone 15 being discharged via the free end 27 of the ozone conduit 23 thereby reaching the ground 25 beneath the building 3 where the termites 5 reside. The ozone 15 has the effect of reducing the population of termites 5 in that region, thereby protecting the building 3 from degradation. It will be understood that in alternative embodiments the treatment controller may be operable to administer the treatment agent in a pulse-like manner, and it may be operable to modify the duration of each pulse. Such pulses may be administered for half a second at a time at intervals in the region of 160 seconds, for example. These intervals may be irregular in order to interfere with any biological cycles of the pests.

The apparatus also includes a detector 29 operable to detect the decay of the ozone 15. The detector 29 communicates with the monitor 7 and extends therefrom into the ground 25 beneath the building 3. In this way, the treatment controller 9 is informed of any changes in the ozone 15 levels and it responds to the changes in the appropriate manner by altering the dosage of ozone if necessary.

Typical operation of the system is as follows. The air/agent (ozone) should be ideally delivered within a temperature range of 0 degrees Celsius (32 degrees Fahrenheit) to 12 degrees Celsius (55 degrees Fahrenheit) and with a humidity of between 0% and 50%.

Based on an assumed migration rate of 0.25 meters per minute airflow of air or air agent mix below a 70 $m^2$ (8 m by 8.75 m) building, the required delivery time would be 35 minutes under ideal conditions and 70 minutes under restricted conditions.

Assuming a void volume beneath the building of 70 $m^2$ by a depth of 300 mm (giving a total volume of 21 $m^3$), the required delivery concentration of agent to air into the void would be 0.5 ppm to allow for a depleted agent level of 0.25 ppm to reach the furthest point of the void area under the average migration rate, and the depleted agent level under the described worst flow conditions would be 0.125 ppm, assuming that the humidity and temperature range is within the ranges described above.

Of course, the air/agent mixture can be altered to accommodate humidity and temperature ranges outside those described above as being ideal.

Treatment periods of air/agent mixture are ideally delivered at one delivery as described above on a seven day cycle and at times when the ideal temperature and humidity levels occur, although these could be more often or less to accommodate a different range of temperature or humidity levels if so required. This will most probably be at the period of night time when these conditions of temperature and humidity levels will occur, although it can also be during daytime too.

The delivery of air only can be used for longer periods of, for example, two hours on a regular period, over a wider range of temperature and humidity levels to achieve preferential reductions of sub-floor humidity levels to further assist the performance of the air/agent mixture when delivered.

Although illustrative embodiments of the invention have been disclosed in detail herein, with reference to the accompanying drawings, it is understood that the invention is not limited to the precise embodiment shown and that various changes and modifications can be effected therein by one skilled in the art without departing from the scope of the invention as defined by the appended claims and their equivalents.

The invention claimed is:

1. An apparatus for protecting a building from degradation by pests, said apparatus comprising:

a monitor operable to acquire environmental condition information relating to environmental conditions affecting the rate of decay of a treatment agent in a vicinity of said building; and a treatment controller operable to control administration of a treatment agent in said vicinity of said building based on said environmental condition information to provide an amount of said treatment agent which, for those environmental conditions, remains below a safety threshold for habitation of said building and reduces a population of said pests, wherein said treatment controller comprises a model describing effects of said environmental conditions on said treatment agent, said treatment controller being operable to utilise said model to determine said amount of said treatment agent which, for those environmental conditions represented by said environmental condition information, remains below said safety threshold.

2. The apparatus as claimed in claim 1, wherein said treatment controller is operable to receive physical condition information relating to at least one of a physical arrangement of said apparatus, geological information in said vicinity of said building and constructional information of said building and said model describes effects of physical conditions on said treatment agent, said treatment controller being operable to utilise said model to determine said amount of said treatment agent which, for those physical conditions represented by said physical condition information and those environmental conditions represented by said environmental condition information, remains below said safety threshold.

3. The apparatus as claimed in claim 1, including:

a decay detector operable to monitor a decay of said treatment agent.

4. The apparatus as claimed in claim 1, wherein said treatment controller is operable to administer said treatment agent in a pulse-like manner, and wherein said treatment controller is operable to modify a duration of each pulse.

5. The apparatus as claimed in claim 1, wherein said treatment controller is operable to modify a concentration of said treatment agent.

6. The apparatus as claimed in claim 1, wherein said treatment agent comprises ozone and said treatment controller comprises an ozoniser.

7. The apparatus as claimed in claim 6, wherein said ozoniser comprises:

a UV lamp.

8. A method implemented by a machine for protecting a building on ground from attack by pests, comprising the steps of:

introducing a treatment agent into the ground beneath the building;

acquiring environmental condition information relating to environmental conditions in a vicinity of said building; and controlling administration of a treatment agent in said vicinity of said building based on said environmental condition information whereby to provide an amount of said treatment agent which for those environmental conditions remains below a safety threshold for habitation of said building and reduces a population of said pests.

9. The method as claimed in claim 8, wherein said step of controlling comprises:

providing a model describing effects of said environmental conditions on said treatment agent, and utilising said model to determine said amount of said treatment agent which, for those environmental conditions represented by said environmental condition information, remains below said safety threshold.

10. The method as claimed in claim 9, wherein said step of acquiring comprises:

receiving physical condition information relating to at least one of a physical arrangement of said apparatus, geological information in said vicinity of said building and constructional information of said building, and said step of controlling comprises:

providing a model describing effects of physical conditions on said treatment agent, and utilising said model to determine said amount of said treatment agent which, for those physical conditions represented by said physical condition information and those environmental conditions represented by said environmental condition information, remains below said safety threshold.

11. The method as claimed in claim 8, comprising the step of:

detecting a decay of said treatment agent.

12. The method as claimed in claim 8, wherein said step of controlling comprises:

administering said treatment agent in a pulse-like manner.

13. The method as claimed in claim 12, wherein said step of administering comprises:

modifying a duration of each pulse.

14. The method as claimed in claim 8, wherein said step of controlling comprises:

modifying a concentration of said treatment agent at the point of introduction into the ground beneath the building.

15. The method as claimed in claim 8, wherein said treatment agent comprises ozone, said method comprising the step of:

providing an ozoniser.

16. Apparatus for protecting a building on ground from degradation by pests, said apparatus comprising:

means for introducing a treatment agent into the ground beneath the building;

a monitor operable to acquire information relating to environmental conditions in the vicinity of said building affecting the rate of decay of the said treatment agent; and a treatment controller operable to control administration of the treatment agent on the basis of the said environmental condition information to provide an amount of said treatment agent which, for those environmental conditions, remains below a safety threshold in the habitable parts of the building and reduces a population of said pests.

17. The apparatus as claimed in claim 16, wherein the said treatment includes a model describing the effects of the said environmental conditions on said treatment agent, the said treatment controller being operable to utilise the model to determine the amount of treatment agent which, for those environmental conditions represented by the said environmental condition information, remains below the said safety threshold.

18. The apparatus as claimed in claim 17, wherein the treatment controller is connected to receive physical condition information relating to at least one of a physical arrangement of said apparatus, geological information in the vicinity of the said building or construction information of the said building and said model describes effects of physical conditions on the treatment agent, the treatment controller being operable to utilise the said model to determine the amount of treatment agent which, for those physical conditions represented by the said physical condition information and those environmental conditions represented by the said environmental condition information, remains below the said safety threshold.

19. Apparatus as claimed in claim 16, including:
a decay detector operable to monitor decay of the said treatment agent.

20. The apparatus as claimed in claim 16, wherein the said treatment controller is operable to administer the said treatment agent in pulses.

21. The apparatus as claimed in claim 20, wherein the said treatment controller is operable to vary the duration of said pulses.

22. Apparatus as claimed in claim 16, wherein the said treatment controller is operable to modify a concentration of said treatment agent.

23. The apparatus as claimed in claim 16, wherein said treatment agent comprises ozone and said treatment controller includes an ozoniser.

24. The apparatus as claimed in claim 23, wherein the said ozoniser comprises:
a UV lamp.

* * * * *